US012744981B2

(12) United States Patent
Abraham Chintapalli

(10) Patent No.: US 12,744,981 B2
(45) Date of Patent: Sep. 22, 2026

(54) METHODS, SYSTEMS, APPARATUSES, AND DEVICES FOR FACILITATING MANAGING THE BODY LANGUAGE OF A USER DURING A VIDEO COMMUNICATION SESSION

(71) Applicant: Paul Abraham Chintapalli, Plano, TX (US)

(72) Inventor: Paul Abraham Chintapalli, Plano, TX (US)

( * ) Notice: Subject to any disclaimer, the term of this patent is extended or adjusted under 35 U.S.C. 154(b) by 333 days.

(21) Appl. No.: 18/401,332

(22) Filed: Dec. 29, 2023

(65) Prior Publication Data

US 2024/0137629 A1 Apr. 25, 2024

Related U.S. Application Data

(63) Continuation-in-part of application No. 18/219,108, filed on Jul. 7, 2023.

(51) Int. Cl.
*H04N 23/53* (2023.01)
*H04N 17/00* (2006.01)
(Continued)

(52) U.S. Cl.
CPC ........... *H04N 23/531* (2023.01); *H04N 17/00* (2013.01); *H04N 23/63* (2023.01); *H04N 23/51* (2023.01)

(58) Field of Classification Search
CPC ...... H04N 23/531; H04N 17/00; H04N 23/63; H04N 23/51; H04N 7/142; G06F 1/1605;
(Continued)

(56) References Cited

U.S. PATENT DOCUMENTS

2010/0118112 A1* 5/2010 Nimri .................... H04N 7/142 348/E7.083
2013/0191857 A1* 7/2013 Guinn .................... H04H 20/82 725/24
2021/0405865 A1* 12/2021 Faulkner ................ H04N 7/147

OTHER PUBLICATIONS

Kandao Launches Standalone Video Conferencing Terminal at CES 2023, article establishing date of public knowledge, by Emory Kale posted Jan. 10, 2023 <https://displaydaily.com/kandao-launches-standalone-video-conferencing-terminal-at-ces-2023/> (Year: 2023).*
(Continued)

*Primary Examiner* — Duc Nguyen
*Assistant Examiner* — Carissa A Jones
(74) *Attorney, Agent, or Firm* — Dhiraj Jindal; PATENT YOGI LLC

(57) ABSTRACT

An apparatus for facilitating managing the body language of a user during a video communication session includes an image capturing device comprising an image capturing device housing and an image capturing unit that generates a first content stream comprising the body language of the user by capturing images of the user, display devices attached to the image capturing device in an arrangement, and a communication interface. The display devices are radially arranged around the image capturing device. Each of the display devices includes a display device housing and a display unit for displaying second content streams. The attaching mechanisms attaches the display device housing sides of the image capturing device housing. The user engages in the video communication session based on the displaying and the capturing. The displaying allows the managing of the body language during the capturing. The communication interface transmits the first content stream to a device.

19 Claims, 20 Drawing Sheets

(51) Int. Cl.
*H04N 23/51* (2023.01)
*H04N 23/63* (2023.01)

(58) Field of Classification Search
CPC ........... G06F 1/1607; G06F 2200/1613; G06F 1/1647; G06F 1/165; G06F 1/1684; G06F 1/1686; G06F 3/013; G06F 3/0487; G06F 3/1423; G06F 3/1446; G06F 1/1637; G09G 2320/0693
USPC ......... 348/14.12, 14.03, 14.02, 14.08, 14.09, 348/14.1, 14.77, 14.78
See application file for complete search history.

(56) References Cited

OTHER PUBLICATIONS

New Release! Introducing the Kandao Meeting Ultra—Kandao, posted May 12, 2023 <https://displaydaily.com/kandao-launches-standalone-video-conferencing-terminal-at-ces-2023/> (Year: 2023).*
Kandao Meeting Ultra—Product Website <https://www.kandaovr.com/meeting-ultra> (Year: 2023).*
Kandao Meeting Ultra—Support User Guide <https://www.kandaovr.com/support/meeting-ultra/OxwGMwGLMZED> (Year: 2023).*
The New KanDao Meeting Ultra Is An Ideal Solution For Hybrid Meetings—posted Jun. 30, 2023 <https://www.kandaovr.com/newsroom/article/1133> (Year: 2023).*
Kandao Meeting Ultra review: hands-on test of the 4K 360-degree conference cam—posted Jun. 14, 2023 <https://www.kandaovr.com/newsroom/article/1135> (Year: 2023).*

* cited by examiner

METHODS, SYSTEMS, APPARATUSES, AND DEVICES FOR FACILITATING MANAGING THE BODY LANGUAGE OF A USER DURING A VIDEO COMMUNICATION SESSION

CROSS-REFERENCE TO RELATED APPLICATION

This application is a continuation in part of U.S. patent application Ser. No. 18/219,108, titled "SYSTEMS, METHODS, APPARATUSES, AND DEVICES FOR MANAGING A GAZE OF A USER ENGAGED IN A VISUAL COMMUNICATION SESSION WITH AN AUDIENCE", filed Jul. 7, 2023, which is incorporated by reference herein in its entirety.

FIELD OF THE INVENTION

Generally, the present disclosure relates to the field of data processing. More specifically, the present disclosure relates to methods, systems, apparatuses, and devices for facilitating managing the body language of a user during a video communication session.

BACKGROUND OF THE INVENTION

With the increased use of video conferences and video meetings, most often the presenter's (user or individual) focus is not on the virtual audience, but elsewhere because the presenter focuses on someone in the meeting or the presenter is focusing on themselves. This results in a lack of eye contact, which sends a mixed or wrong signal to the interviewer or the audience with whom the presenter is having video conferences and video meetings. The lack of eye contact has a high impact in critical situations such as job interviews, sales presentations, webinars, workplace meetings, teaching, etc.

Existing apparatuses such as holders for webcams (such as PlexiCam™ and Center Cam™) for facilitating video communication sessions are deficient with regard to several aspects. Further, the current apparatuses are just webcam holders to place a new webcam across the laptop/desktop screen. As a result, different apparatuses are needed that manage the body language (eye contact) of the user during the video communication session and hence allow the user to have natural eye contact during the video communication session. Further, the current apparatuses are bulky and do not work fluidly. Further, the current apparatuses have limited use and need dismantling after a video call.

Emerging technologies such as AI technology implemented by Microsoft™/Nvidia™/Casablanca™ for facilitating video communication sessions are deficient with regard to several aspects. Further, emerging technologies are not available for devices operated on Windows or Mac operating systems. Further, emerging technologies don't work on legacy (or old) computers. Further, the emerging technologies require new computers that have greater processing power which makes the emerging technologies expensive. Further, the emerging technologies are developed by global corporations therefore they are dependent on other components such as chips, software, etc. which are also produced by global corporations. Further, the emerging technologies do not fix the unnatural glare of the individual during video communication sessions.

Existing devices such as movable wireless webcams (Dell's Concept Pari) that may be movably mounted on a screen of a device (laptop, desktop, etc.) are provided by Dell™ for facilitating video communication. Further, the existing devices are deficient with regard to several aspects. Further, the existing devices may only be mounted on the screen of the device which is already compatible with the existing devices and may not be mounted to the screen of any other devices. Further, the existing devices are just webcams and do not offer any solution to manage the body language of a user during a video communication session. Moreover, the existing devices also do not offer any solution to provide visual feedback to the user during the video communication session. Furthermore, the existing devices also do not offer any solution that is a stand-alone solution for providing a video communication session and allowing managing the body language of the user during the video communication session.

Therefore, there is a need for improved methods, systems, apparatuses, and devices for facilitating managing the body language of a user during a video communication session that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating managing a body language of a user during a video communication session, in accordance with some embodiments. Accordingly, the apparatus may include an image capturing device, a plurality of display devices, and at least one communication interface. Further, the image capturing device may include an image capturing device housing and an image capturing unit. Further, the image capturing unit may be configured for generating a first content stream comprising the body language of the user by capturing a plurality of images of the user. Further, the plurality of display devices may be configured to be attached to the image capturing device in at least one arrangement using a plurality of attaching mechanisms. Further, the plurality of display devices may be radially arranged around the image capturing device. Further, each of the plurality of display devices may include a display device housing and a display unit. Further, the plurality of attaching mechanisms attaches the display device housing of the plurality of display devices to a plurality of sides of the image capturing device housing. Further, the display unit of the plurality of display devices may be configured for displaying a plurality of second content streams to the user. Further, the user engages in the video communication session based on the displaying of the plurality of second content streams and the capturing of the first content stream. Further, the displaying of the plurality of second content streams allows the managing of the body language of the user during the capturing of the first content stream. Further, the at least one communication interface may be communicatively coupled with the image capturing unit. Further, the at least one communication interface may be configured for transmitting the first content stream to at least one device over at least one of a wired communication channel and a wireless communication channel.

Further disclosed herein is an apparatus for facilitating managing a body language of a user during a video communication session, in accordance with some embodiments.

Accordingly, the apparatus may include an image capturing device, a plurality of display devices, and at least one communication interface. Further, the image capturing device may include an image capturing device housing and an image capturing unit. Further, the image capturing unit may be configured for generating a first content stream comprising the body language of the user by capturing a plurality of images of the user. Further, the plurality of display devices may be configured to be attached to the image capturing device in at least one arrangement using a plurality of attaching mechanisms. Further, the plurality of display devices may be radially arranged around the image capturing device. Further, each of the plurality of display devices may include a display device housing and a display unit. Further, the plurality of attaching mechanisms attaches the display device housing of the plurality of display devices to a plurality of sides of the image capturing device housing. Further, the display unit of the plurality of display devices may be configured for displaying a plurality of second content streams to the user. Further, the user engages in the video communication session based on the displaying of the plurality of second content streams and the capturing of the first content stream. Further, the displaying of the plurality of second content streams allows the managing of the body language of the user during the capturing of the first content stream. Further, the plurality of display devices further may include at least one first display device and at least one second display device. Further, the image capturing unit may be communicatively coupled with the display unit of the at least one first display device. Further, the display unit of the at least one first display device may be configured for displaying the first content stream. Further, the display unit of the at least one second display device may be configured for displaying at least one of the plurality of second content streams. Further, the at least one communication interface may be communicatively coupled with the image capturing unit. Further, the at least one communication interface may be configured for transmitting the first content stream to at least one device over at least one of a wired communication channel and a wireless communication channel.

Further disclosed herein is an apparatus for facilitating managing a body language of a user during a video communication session, in accordance with some embodiments. Further, the apparatus may include an image capturing device, a plurality of display devices, at least one communication interface, at least one mounting element, and a processing device. Further, the image capturing device may include an image capturing device housing and an image capturing unit. Further, the image capturing unit may be configured for generating a first content stream comprising the body language of the user by capturing a plurality of images of the user. Further, the plurality of display devices may be configured to be attached to the image capturing device in at least one arrangement using a plurality of attaching mechanisms. Further, the plurality of display devices may be radially arranged around the image capturing device. Further, each of the plurality of display devices may include a display device housing and a display unit. Further, the plurality of attaching mechanisms attaches the display device housing of the plurality of display devices to a plurality of sides of the image capturing device housing. Further, the display unit of the plurality of display devices may be configured for displaying a plurality of second content streams to the user. Further, the user engages in the video communication session based on the displaying of the plurality of second content streams and the capturing of the first content stream. Further, the displaying of the plurality of second content streams allows the managing of the body language of the user during the capturing of the first content stream. Further, the at least one communication interface may be communicatively coupled with the image capturing unit. Further, the at least one communication interface may be configured for transmitting the first content stream to at least one device over at least one of a wired communication channel and a wireless communication channel. Further, the at least one mounting element may be attached to at least one of the image capturing device housing and the display device housing of at least one of the plurality of display devices. Further, the at least one mounting element may be configured for attaching the apparatus to a body of a computing device. Further, the computing device may include a display unit. Further, the processing device may be configured to be communicatively coupled with the computing device. Further, the processing device may be configured for obtaining at least one data from the computing device. Further, the processing device may be configured for determining a performance of at least one operation by the computing device based on the at least one data. Further, the performance may include a positive performance and a negative performance. Further, the processing device may be configured for determining the plurality of second content streams based on the performance and the at least one data. Further, the display unit of each of the plurality of display devices may be communicatively coupled with the processing device. Further, the displaying of the plurality of second content streams may be based on the determining of the plurality of second content streams.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
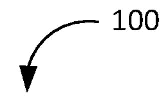
FIG. 1 is a top perspective view of an apparatus 100 for facilitating managing a body language of a user during a video communication session, in accordance with some embodiments.
Figure 1:
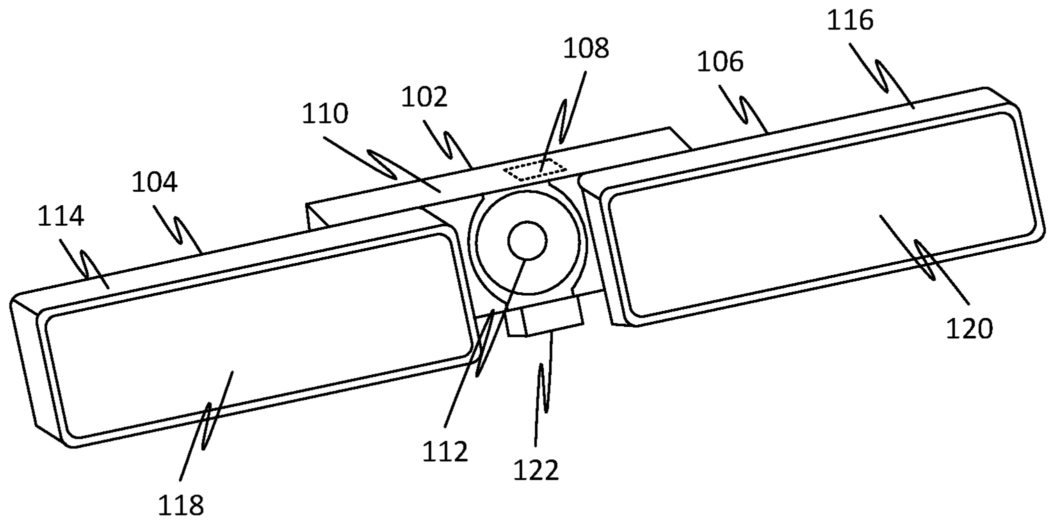

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an apparatus for facilitating managing a body language of a user during a video communication session, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer and/or the computing device may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer and/or the computing device may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer and/or the computing device may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Overview:

The present disclosure describes an apparatus for facilitating managing a body language of a user during a video communication session.

Further, the apparatus may include a webcam (camera) placed between two mini-monitors. The apparatus allows the speaker to focus on the camera while being able to read from the monitors. The apparatus simulates a typical teleprompter that allows the user to gaze from one side to the other without losing eye contact.

Further, the present disclosure describes an apparatus (TeleKam) that includes a webcam (camera) embedded between two monitors to enable the monitors to function as teleprompters without losing eye contact with the audience. Further, the apparatus may include a microphone. Further, the apparatus realized a TeleKam application by placing the monitors horizontally or vertically around the webcam where the webcam is in the middle. Further, the apparatus provides a TeleKam function wherein the monitor functions as an extended monitor in the absence of a video meeting, a video telecast, and/or a video podcast. Further, the apparatus provides a TeleKam function wherein the monitors function as two extra monitors with proper wire configuration of the monitors in the absence of a video meeting, a video telecast, and/or a video podcast.

Further, the present disclosure describes an apparatus that includes a webcam that is embedded between two monitors as a single piece of equipment that can be folded for ergonomic and/or packaging purposes. The webcam may be used just like any other webcam, and the two monitors may be used to extend an existing screen where a presentation can be scrolled. The apparatus allows a presenter's focus to be in the same longitudinal space on the monitors as well as the webcam, thereby maintaining a natural eye contact between the presenter and the audience. Further, one or two monitors may also be placed above or below the webcam, or a combination. The swivel mechanism used for connecting the two monitors to the webcam allows the monitors to be placed in horizontal or vertical space according to the presenter's comfort zone. Further, the apparatus (TeleKam) may be attached to a tripod away from a computer to use the apparatus as a stand-alone teleprompter for a presentation or a speech. Further, when the apparatus is not in use for the video meeting, the monitors may be used as two auxiliary monitors for displaying data such as a calendar, clock, etc.

Further, the present disclosure describes an apparatus that is a teleprompter solution with visual feedback. Further, the apparatus has a dual-purpose display using two monitors. Further, one monitor may be used for self-positioning and the other monitor for podcasting with the audience or speaking notes. Further, the apparatus is a high-end podcast/broadcast solution in the field for single-person operation or live broadcasting. Further, the apparatus is compatible with older versions of laptops, current versions of laptops, and newer versions of laptops, and also functions as a stand-alone with a micro-computer having Wi-Fi capability. Further, the webcam of the apparatus has embedded microcomputer options to connect to a Wi-Fi network, keyboard, and Bluetooth enablement options.

Further, the present disclosure describes an apparatus that allows a user to have seamless and instantaneous eye contact with live teleprompter-like feedback from start to finish. Further, the apparatus may include an onboard microcomputer for live podcasting or broadcasting. Further, the apparatus may provide a feature of trackability on the field by having an (Internet Protocol) IP address. Further, the apparatus has a SaaS application (app) to program controls of the apparatus. Further, the apparatus is universally integrable.

Further, the apparatus may be used as add-on with all laptops (older versions, current versions, and newer versions). Further, the apparatus may function as a stand-alone device.

Further, the present disclosure describes an apparatus (TeleKam) that has a camera and 2-4 monitors placed in horizontal or vertical space, and a combination thereof. Depending on the need of the application of the apparatus, the monitors can be added and configured. In a standard configuration, the apparatus has two monitors (left and right) attached on hinges, which enable the monitors to be folded forward or backward for easy storage.

Further, the apparatus may include an onboard microcomputer. Further, the camera and the monitors are controlled by the onboard microcomputer onboard. The onboard microcomputer has onboard memory (RAM), High definition (HD) resolution, and a wireless communication (Wi-Fi) module, which enables functionality and programmability with or without an external computer. The onboard microcomputer makes the apparatus ideal for field applications, such as live podcasting or broadcasting.

Further, the monitors may be set up to be clones or extensions. This enables one monitor to display an audience, an anchor, or a self and the other monitor to display talking points. Making both monitors as clones enables a typical teleprompter function for the apparatus.

Further, the apparatus may include a mounting mechanism. Further, the apparatus may be used as a stand-alone gadget. Further, the apparatus may be placed above the laptop screen or on a tripod using the mounting mechanism for solo field applications (such as podcast or broadcast)

Further, the camera of the apparatus may be a stand-alone DSLR camera. Further, the apparatus has video or picture storage capability through the microcomputer. The camera enables live podcast or broadcast on the road with a Wi-Fi connection. Further, the Wi-Fi connection automatically facilitates an IP address for location trackability. Further, the apparatus may have various applications such as indoor studio podcasting or broadcasting, podcasting or broadcasting from remote field locations, on-the-go high-profile meetings, etc. Further, the apparatus has applications in the fields of Onboarding, Telemedicine, Sales and Marketing, Freelancing, Consultancy, and Teaching.

FIG. 1 is a top perspective view of an apparatus 100 for facilitating managing a body language of a user during a video communication session, in accordance with some embodiments. Accordingly, the apparatus 100 may include an image capturing device 102, a plurality of display devices 104-106, and at least one communication interface 108. Further, the video communication session may include a video meeting, a video conferencing, a video telecasting, a video podcasting, etc.

Further, the image capturing device 102 may include an image capturing device housing 110 and an image capturing unit 112. Further, the image capturing unit 112 may be housed in the mage capturing device housing 110. Further, the image capturing unit 112 may include a webcam sensor, a camera sensor, a video camera sensor, a DSLR camera sensor, etc. Further, the image capturing device housing 110 may be a body of the image capturing device 102. Further, the image capturing unit 112 may be configured for generating a first content stream comprising the body language of the user by capturing a plurality of images of the user. Further, the first content stream may include a feed of a presenter (a video track). Further, the body language may include eye contact, posture, gesture, orientation, facial expression, lean, movement, etc., of the user. Further, the user may be an individual, a presenter, etc.

Figure 3:
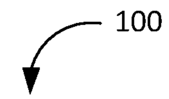
FIG. 3 is a top view of the apparatus 100, in accordance with some embodiments.
Figure 3:
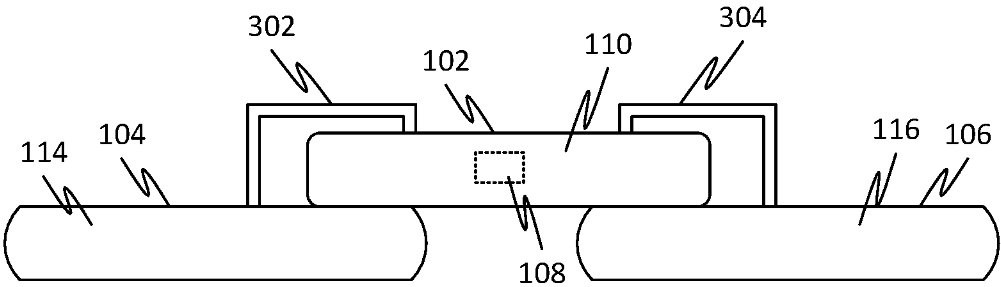

Further, the plurality of display devices 104-106 may be configured to be attached to the image capturing device 102 in at least one arrangement using a plurality of attaching mechanisms 302-304, as shown in FIG. 3. Further, the plurality of display devices 104-106 may include monitors, mini-monitors, etc. Further, the plurality of display devices 104-106 may be radially arranged around the image capturing device 102. Further, the image capturing device 102 may be in the middle of the plurality of display devices 104-106. Further, each of the plurality of display devices 104-106 may include a display device housing (114 and 116) and a display unit (118 and 120). Further, the display device housing (114 and 116) houses the display unit (118 and 120). Further, the display unit (118 and 120) may include a display screen. Further, the display device housing (114 and 116) forms a body of each of the plurality of display devices 104-106. Further, the plurality of attaching mechanisms 302-304 attaches the display device housing (114 and 116) of the plurality of display devices 104-106 to a plurality of sides of the image capturing device housing 110. Further, the display unit (118 and 120) of the plurality of display devices 104-106 may be configured for displaying a plurality of second content streams to the user. Further, the plurality of second content streams may include a set of talking points (text), a feed of an audience (a video track), a feed of a presenter (a video track), a presentation (slides, images, text, charts, graphs, multimedia elements, etc.), etc. Further, the user engages in the video communication session based on the displaying of the plurality of second content streams and the capturing of the first content stream. Further, the displaying of the plurality of second content streams allows the managing of the body language of the user during the capturing of the first content stream. Further, the managing of the body language may include maintaining natural eye contact in the first content stream during the video communication session. Further, the managing of the body language may include maintaining natural eye contact with the image capturing unit 112 during the video communication session.

Further, the at least one communication interface 108 may be communicatively coupled with the image capturing unit 112. Further, the at least one communication interface 108 may be configured for transmitting the first content stream to at least one device over at least one of a wired communication channel and a wireless communication channel. Further, the wireless communication channel may include Bluetooth, Wi-Fi, Infrared, etc. Further, the at least one device may include a computing device, a client device, a user device, a server, etc. Further, the at least one communication interface 108 may be housed in the image capturing device housing 110. Further, the at least one communication interface 108 may be wireless communication interfaces (such as Wi-Fi, Bluetooth, Zigbee, etc.), communication ports, Ethernet interface, USB (Universal Serial Bus) Interfaces, etc. comprised in a microcomputer. Further, the microcomputer may include communication controllers for specific communication protocols. Further, the microcomputer may be a WiFi enabled microcomputer. Further, the WiFi enabled microcomputer may include the at least one communication interface 108.

Further, in some embodiments, the at least one arrangement may include at least one of a vertical arrangement and a horizontal arrangement. Further, the plurality of display devices 104-106 may be linearly aligned along a horizontal axis of the image capturing device 102 in the horizontal arrangement. Further, the plurality of display devices 104-106 may be linearly aligned along a vertical axis of the image capturing device 102 in the vertical arrangement. Further, the vertical axis may be perpendicular to the horizontal axis.

Further, in an embodiment, the plurality of display devices 104-106 may be configured to be movably attached to the image capturing device 102 using the plurality of attaching mechanisms 302-304. Further, the plurality of attaching mechanisms 302-304 allows transitioning of the plurality of display devices 104-106 between a plurality of positions in relation to the image capturing device 102. Further, the transitioning of the plurality of display devices 104-106 transitions the plurality of display devices 104-106 between the horizontal arrangement and the vertical arrangement.

Figure 5:
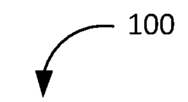
FIG. 5 is a top view of the apparatus 100, in accordance with some embodiments.
Figure 5:
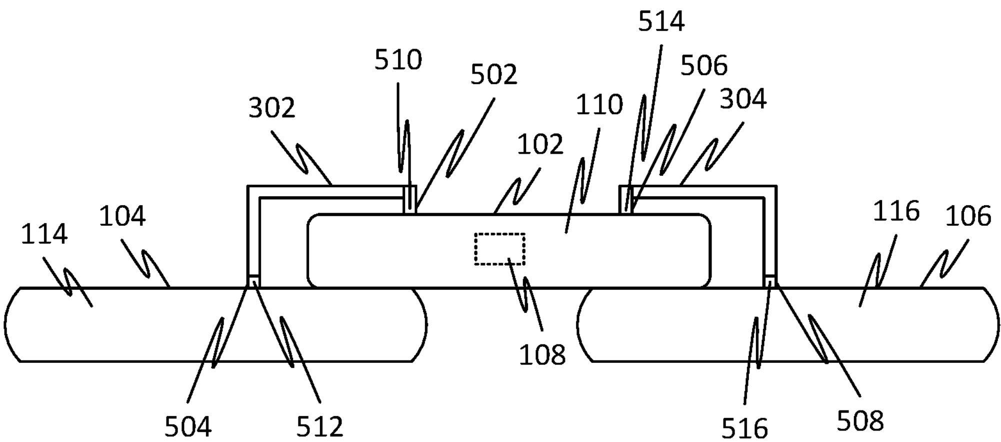

Further, in an embodiment, each of the plurality of attaching mechanisms 302-304 extends between a first end (502 and 506) and a second end (504 and 508), as shown in FIG. 5. Further, each of the plurality of attaching mechanisms 302-304 may include a first articulating element (510 and 514) comprised in the first end (502 and 506) and a second articulating element (512 and 516) comprised in the second end (504 and 508). Further, the first articulating element (510 and 514) and the second articulating element (512 and 516) may include a ball joint assembly, a swiveling element, etc. Further, the first articulating element (510 and 514) of each of the plurality of attaching mechanisms 302-304 may be coupled to the image capturing device housing 110 and the second articulating element (512 and 516) of each of the plurality of attaching mechanisms 302-304 may be coupled to the display device housing (114 and 116) of each of the plurality of display devices 104-106. Further, the first articulating element (510 and 514) allows a rotational movement for the image capturing device housing 110 around a plurality first axes of the first articulating element (510 and 514). Further, the second articulating element (512 and 516) allows the rotational movement for the display device housing (114 and 116) around a plurality of second axes of the second articulating element (512 and 516). Further, the rotational movement of the image capturing device housing 110 allows the transitioning of the plurality of display devices 104-106 between the plurality of positions.

Further, in some embodiments, the plurality of display devices 104-106 may include a pair of horizontal display devices and a pair of vertical display devices. Further, the at least one arrangement may include a vertical arrangement for the pair of vertical display devices and a horizontal arrangement for the pair of horizontal display devices. Further, the pair of horizontal display devices may be linearly aligned along a horizontal axis of the image capturing device 102 in the horizontal arrangement. Further, the pair of vertical display devices may be linearly aligned along a vertical axis of the image capturing device 102 in the vertical arrangement. Further, the vertical axis may be perpendicular to the horizontal axis.

Further, in some embodiments, the plurality of display devices 104-106 may be further configured to be hingedly attached to the image capturing device 102 using the plurality of attaching mechanisms 302-304. Further, the plurality of attaching mechanisms 302-304 allows transitioning of the plurality of display devices 104-106 between at least one folded configuration and an unfolded configuration in relation to the image capturing device 102. Further, the plurality of display devices 104-106 may be aligned in a flat plane with the image capturing device 102 in the unfolded configuration. Further, the plurality of display devices 104-106 may be folded over at least one of the image capturing device 102 and at least one of the plurality of display devices 104-106 in the at least one folded configuration.

Figure 6:
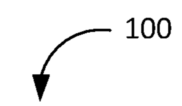
FIG. 6 is a top view of the apparatus 100, in accordance with some embodiments.
Figure 6:
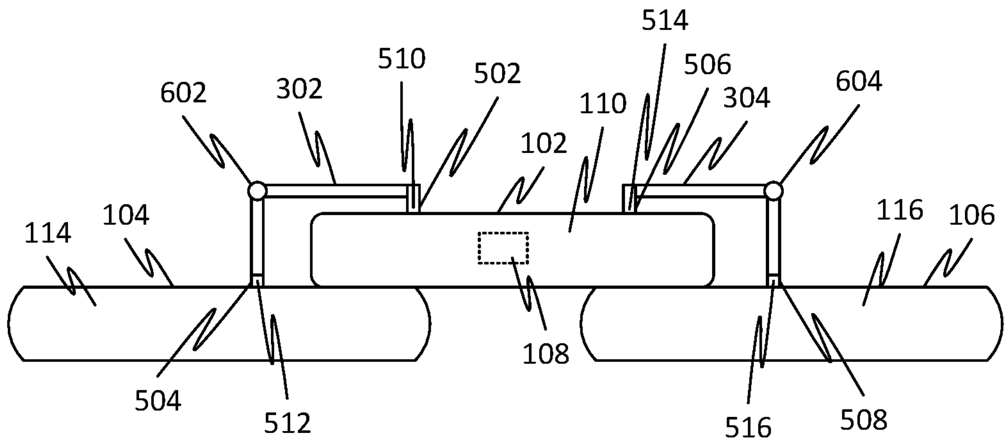

Further, in an embodiment, each of the plurality of attaching mechanisms 302-304 extends between the first end (502 and 506) and the second end (504 and 508). Further, each of the plurality of attaching mechanisms 302-304 may include a hinge element (602 and 604), as shown in FIG. 6, between the first end (502 and 506) and the second end (504 and 508). Further, the hinge element (602 and 604) may include a hinge joint assembly, a hinge, etc. Further, the first end (502 and 506) of each of the plurality of attaching mechanisms 302-304 may be attached to the image capturing device housing 110 and the second end (504 and 508) of each of the plurality of attaching mechanisms 302-304 may be coupled to the display device housing (114 and 116) of each of the plurality of display devices 104-106. Further, the hinge element (602 and 604) allows a rotational movement for the image capturing device housing 110 around a central axis of the hinge element (602 and 604) in relation to the image capturing device housing 110. Further, the rotational movement of the image capturing device housing 110 in relation to the display device housing (114 and 116) allows the transitioning of the plurality of display devices 104-106 between the at least one folded configuration and the unfolded configuration.

In further embodiments, the apparatus 100 may include at least one mounting element 122 attached to at least one of the image capturing device housing 110 and the display device housing (114 and 116) of at least one of the plurality of display devices 104-106. Further, the at least one mounting element 122 may include a clamp, a holder, a clip-on mechanism, a permanent magnet, etc.

Figure 8:
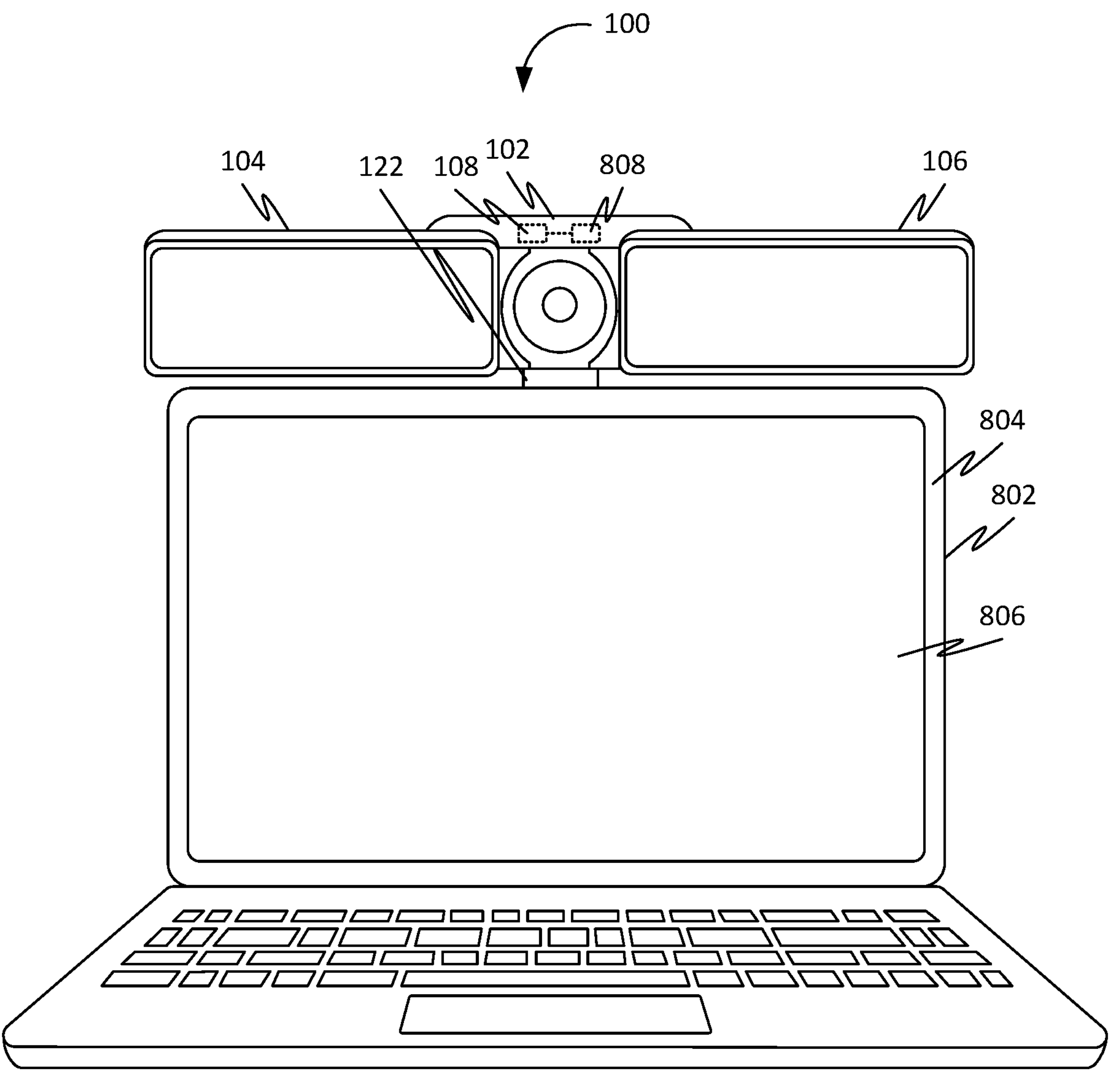
FIG. 8 is a front perspective view of the apparatus 100 with the computing device 802, in accordance with some embodiments.

Further, in an embodiment, the at least one mounting element 122 may be configured for attaching the apparatus 100 to a body 804 of a computing device 802, as shown in FIG. 8. Further, the computing device 802 may include a laptop, a desktop, a tablet, a smartphone, etc. Further, the computing device 802 may include a display unit 806. Further, the display unit 806 of the computing device 802 may include a display screen. Further, the apparatus 100 further may include a processing device 808, as shown in FIG. 8. Further, the processing device 808 may be housed in the image capturing device housing 110. Further, the processing device 808 may be configured to be communicatively coupled with the computing device 802. Further, the processing device 808 may be configured for obtaining at least one data from the computing device 802. Further, the processing device 808 may be configured for determining a performance of at least one operation by the computing device 802 based on the at least one data. Further, the at least one operation may correspond to the video communication session initiated via the computing device 802. Further, the performance may include a positive performance and a negative performance. Further, the positive performance may be determined when the video communication session is ongoing and the negative performance may be determined when the video communication session is not ongoing. Further, the processing device 808 may be configured for determining the plurality of second content streams based on the performance and the at least one data. Further, the display unit (118 and 120) of each of the plurality of display devices 104-106 may be communicatively coupled with the processing device 808. Further, the displaying of the plurality of second content streams may be based on the determining of the plurality of second content streams.

Further, in an embodiment, the determining of the plurality of second content streams may include obtaining at least one third content stream associated with the video communication session from the computing device based on the positive performance. Further, the display unit 806 of the computing device 802 displays the at least one third content stream. Further, the at least one third content stream may include a feed of an audience (a video track), a set of talking points (text), a presentation (slides, images, text, charts, graphs, multimedia elements, etc.), etc. Further, the determining of the plurality of second content streams may include processing the at least one third content stream. Further, the processing may include modifying at least one characteristic of the plurality of second content streams to make the plurality of second content streams displayable by the display unit (118 and 120) of each of the plurality of display devices 104-106. Further, the at least one characteristic may include a resolution, a refresh rate, a frame size, a frame rate, etc. Further, the determining of the plurality of second content streams may include generating the plurality of second content streams based on the processing. Further, the display unit 806 of the computing device 802 ceases to display the at least one third content stream based on the generating of the plurality of second content streams.

Further, in an embodiment, the determining of the plurality of second content streams may include identifying the plurality of second content streams based on the negative performance. Further, the plurality of second content streams may include a visual representation of a calendar, a clock, etc.

Figure 9:
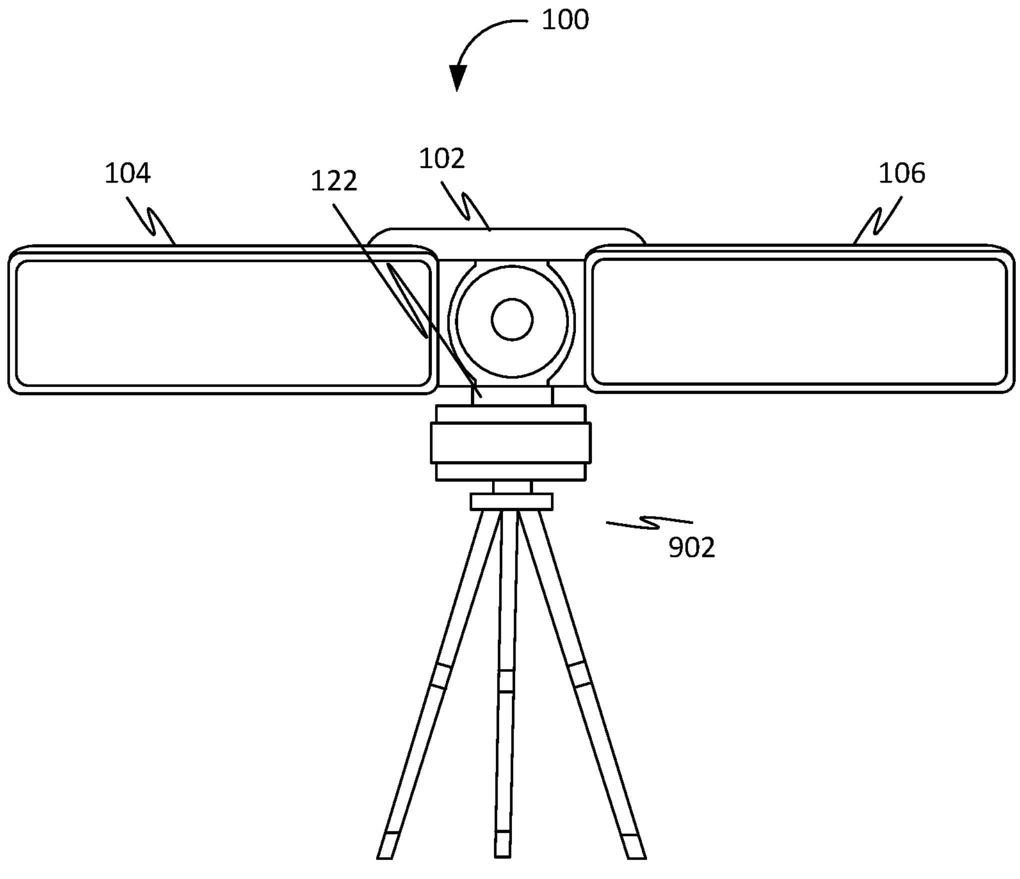
FIG. 9 is a front perspective view of the apparatus 100 with the at least one support 902, in accordance with some embodiments.

Further, in an embodiment, the at least one mounting element 122 may be configured for mounting the apparatus 100 to at least one support 902, as shown in FIG. 9. Further, the at least one support 902 may include a tripod.

Further, in some embodiments, the display unit (118 and 120) of each of the plurality of display devices 104-106 may be configured for collectively displaying the plurality of second content streams.

Further, in some embodiments, the display unit (118 and 120) of each of the plurality of display devices 104-106 may be configured for individually displaying each of the plurality of second content streams. Further, the individually displaying may include separately displaying each of the plurality of second content streams. Further, in an instance, the plurality of second content streams may be similar. Further, in an instance, the plurality of second content streams may be disparate.

Further, in some embodiments, the plurality of display devices 104-106 may include at least one first display device 104 and at least one second display device 106. Further, the image capturing unit 112 may be communicatively coupled with the display unit 118 of the at least one first display device 104. Further, the display unit 118 of the at least one first display device 104 may be configured for displaying the first content stream. Further, the display unit 120 of the at least one second display device 106 may be configured for displaying at least one of the plurality of second content streams.

Further, in some embodiments, the plurality of second content streams may include at least one primary second content stream and at least one secondary second content stream. Further, the plurality of display devices 104-106 may include at least one first display device and at least one second display device. Further, the display unit 118 of each of the at least one first display device 104 may be configured for displaying the at least one primary second content stream. Further, the display unit 120 of the at least one second display device 106 may be configured for displaying the at least one secondary second content stream. Further, the at least one primary second content stream may be different from the at least one secondary second content stream. Further, the at least one primary second content stream may include a feed of an audience, a feed of a presenter, etc. and the at least one secondary second content stream may include a set of talking points, a presentation, etc.

Further, in an embodiment, the at least one communication interface 108 may be configured for receiving the at least one primary second content stream from the at least one device.

Figure 10:
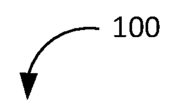
FIG. 10 is a top perspective view of the apparatus 100, in accordance with some embodiments.
Figure 10:
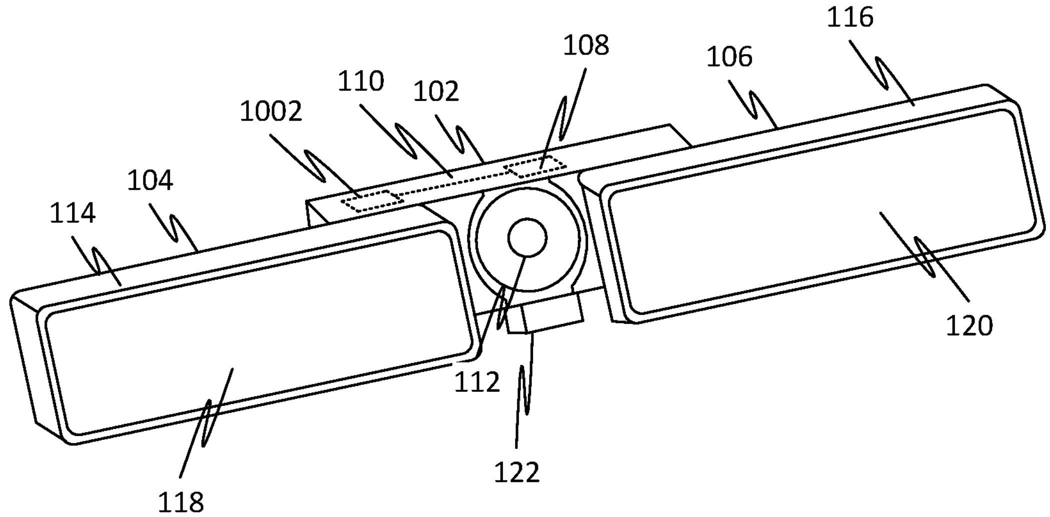

In an embodiment, the apparatus 100 may include a storage device 1002, as shown in FIG. 10, communicatively coupled with the display unit (118 and 120) of the plurality of display devices 104-106. Further, the storage device 1002 may be configured for storing the at least one secondary second content stream. Further, the storage device 1002 may be housed in the image capturing device housing 110.

In further embodiments, the apparatus 100 may include the storage device 1002 communicatively coupled with the image capturing unit 112. Further, the storage device 1002 may be configured for storing the first content stream.

Further, in some embodiments, the apparatus 100 may be associated with a unique identifier. Further, the unique identifier may include an internet protocol (IP) address. Further, the at least one communication interface 108 may be configured for receiving the plurality of second content streams from the at least one device through at least one network over at least one of the wired communication channel and the wireless communication channel using the unique identifier. Further, the transmitting of the first content stream may include transmitting the first content stream to the at least one device through the at least one network over at least one of the wired communication channel and the wireless communication channel using the unique identifier.

Figure 16:
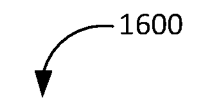
FIG. 16 is a front view of an apparatus 1600 for facilitating managing a body language of a user during a video communication session, in accordance with some embodiments.
Figure 16:
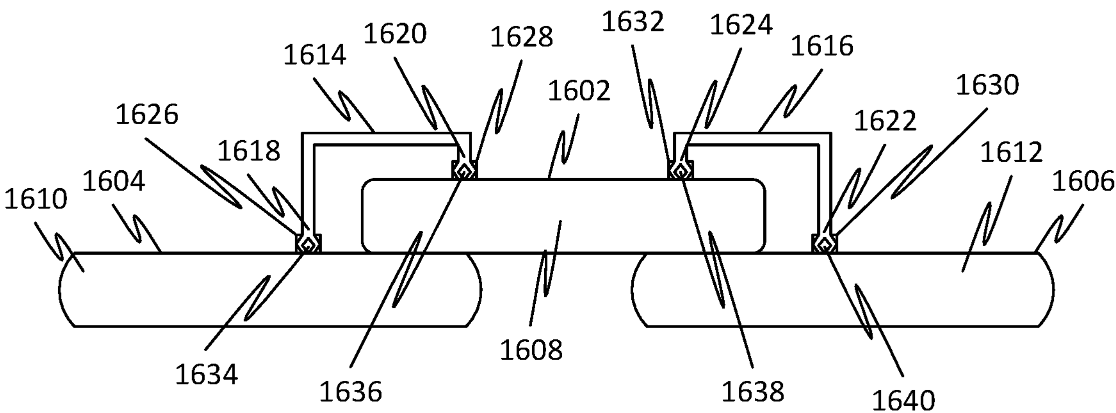

Further, in some embodiments, the plurality of display devices 104-106 may be configured to be removably attached to the image capturing device 102 using the plurality of attaching mechanisms 302-304. Further, each of the plurality of attaching mechanisms 302-304 extends between a first end (502 and 506) and a second end (504 and 508). Further, each of the plurality of attaching mechanisms 302-304 may include a first snap feature (such as a first snap feature (1626, 1628, 1630, and 1632), as shown in FIG. 16) comprised in at least one of the first end (502 and 506) and the second end (504 and 508). Further, at least one of the image capturing device housing 110 and the display device housing (114 and 116) may include a second snap feature (such as a second snap feature (1634, 1636, 1638, and 1640), as shown in FIG. 16). Further, the first snap feature disengageably engages with the second snap feature.

Figure 2:
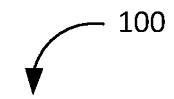
FIG. 2 is a front view of the apparatus 100, in accordance with some embodiments.
Figure 2:
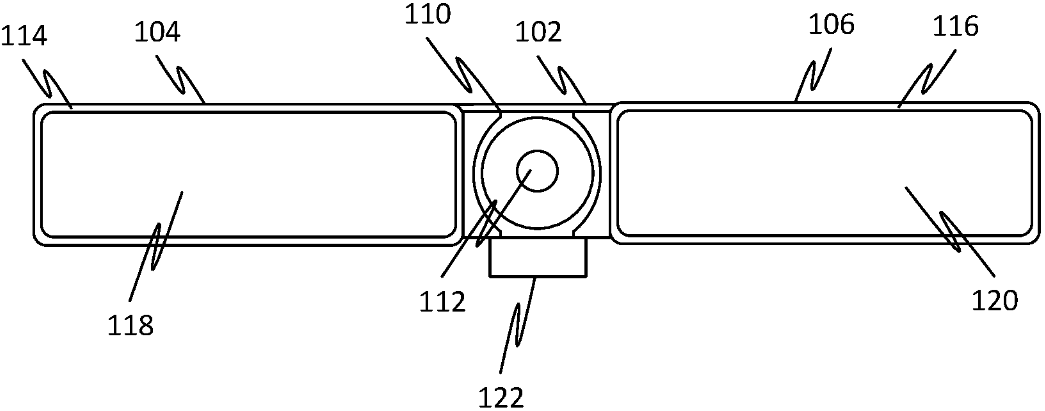

FIG. 2 is a front view of the apparatus 100, in accordance with some embodiments.

FIG. 3 is a top view of the apparatus 100, in accordance with some embodiments.

Figure 4:
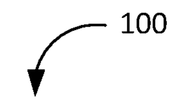
FIG. 4 is a bottom view of the apparatus 100, in accordance with some embodiments.
Figure 4:
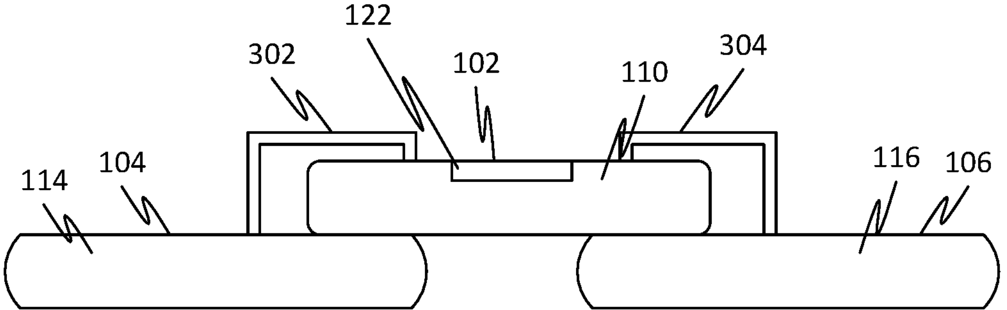

FIG. 4 is a bottom view of the apparatus 100, in accordance with some embodiments.

FIG. 5 is a top view of the apparatus 100, in accordance with some embodiments.

FIG. 6 is a top view of the apparatus 100, in accordance with some embodiments.

Figure 7:
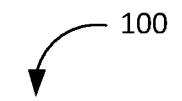
FIG. 7 is a top view of the apparatus 100 in the at least one folded configuration, in accordance with some embodiments.
Figure 7:
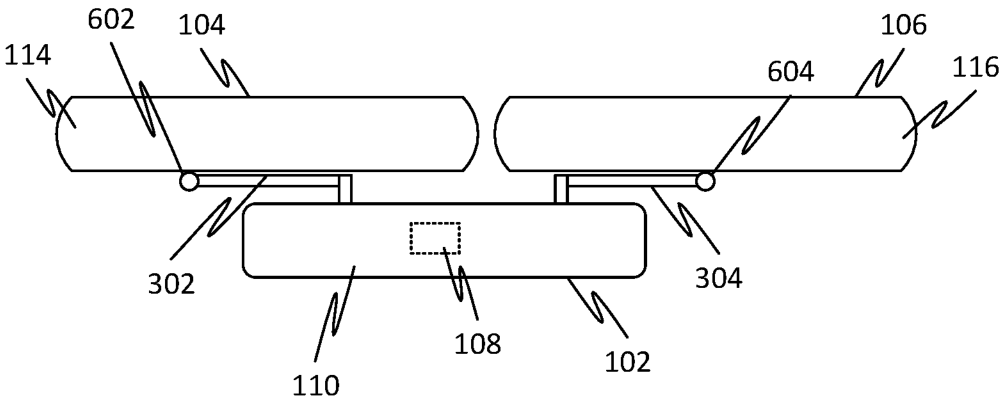

FIG. 7 is a top view of the apparatus 100 in the at least one folded configuration, in accordance with some embodiments.

FIG. 8 is a front perspective view of the apparatus 100 with the computing device 802, in accordance with some embodiments.

FIG. 9 is a front perspective view of the apparatus 100 with the at least one support 902, in accordance with some embodiments.

FIG. 10 is a top perspective view of the apparatus 100, in accordance with some embodiments.

Figure 11:
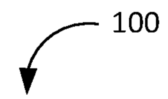
FIG. 11 is a top perspective view of the apparatus 100, in accordance with some embodiments.
Figure 11:
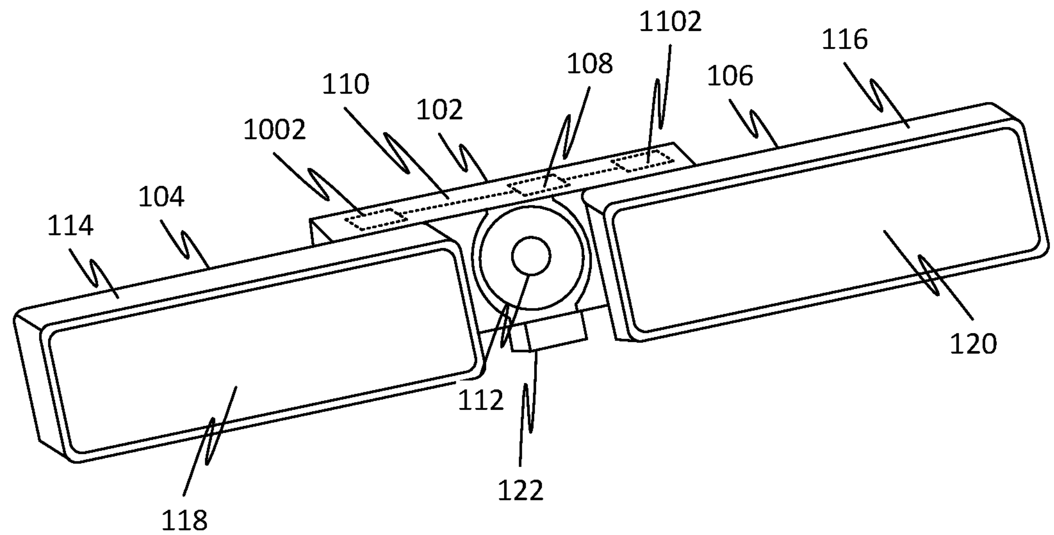

FIG. 11 is a top perspective view of the apparatus 100, in accordance with some embodiments. Further, the apparatus 100 may include a processing device 1102 communicatively coupled with the at least one communication interface 108, the display unit (118 and 120) of the plurality of display devices 104-106, the image capturing unit 112, and the storage device 1002. Further, the processing device 1102 may be configured for controlling at least one of the capturing and the displaying based on at least one instruction stored on the storage device 1002.

Figure 12:
FIG. 12 is a front view of an apparatus 1200 for facilitating managing a body language of a user during a video communication session, in accordance with some embodiments.
Figure 12:
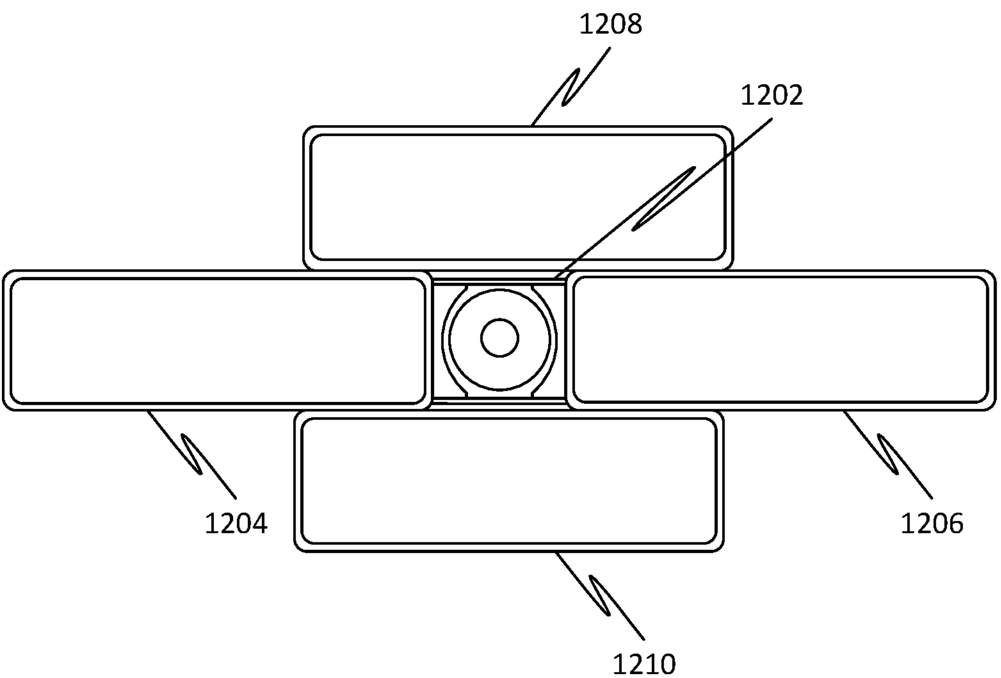

FIG. 12 is a front view of an apparatus 1200 for facilitating managing a body language of a user during a video communication session, in accordance with some embodiments. Further, the apparatus 1200 may include an image capturing device 1202 and a plurality of display devices 1204-1210. Further, the plurality of display devices 1204-1210 may include a pair of horizontal display devices 1204-1206 and a pair of vertical display devices 1208-1210. Further, the pair of vertical display devices 1208-1210 may be radially arranged around the image capturing device 1202 in a vertical arrangement and the pair of horizontal display devices 1204-1206 may be radially arranged around the image capturing device 1202 in a horizontal arrangement. Further, the pair of horizontal display devices 1204-1206 may be linearly aligned along a horizontal axis of the image capturing device 1202 in the horizontal arrangement. Further, the pair of vertical display devices 1208-1210 may be linearly aligned along a vertical axis of the image capturing device 1202 in the vertical arrangement. Further, the vertical axis may be perpendicular to the horizontal axis.

Figure 13:
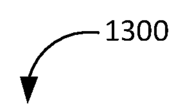
FIG. 13 is a front perspective view of an apparatus 1300 for facilitating managing a body language of a user during a video communication session in a horizontal arrangement, in accordance with some embodiments.
Figure 13:
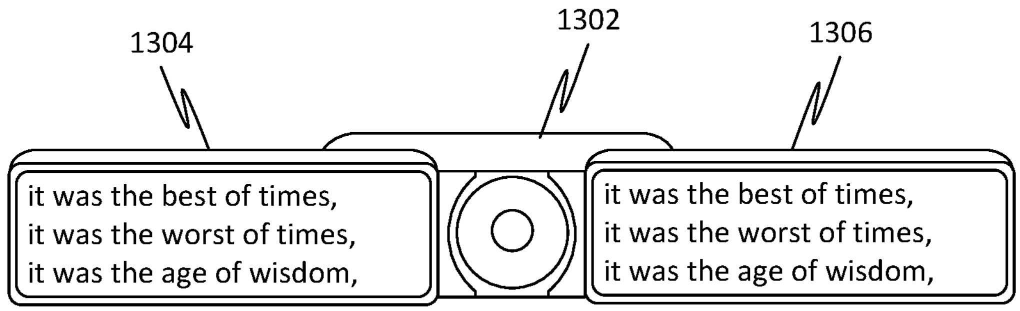

FIG. 13 is a front perspective view of an apparatus 1300 for facilitating managing a body language of a user during a video communication session in a horizontal arrangement, in accordance with some embodiments. Further, the apparatus 1300 may include an image capturing device 1302 and a plurality of display devices 1304-1306. Further, the plurality of display devices 1304-1306 may be linearly aligned along a horizontal axis of the image capturing device 1302 in the horizontal arrangement.

Figure 14:
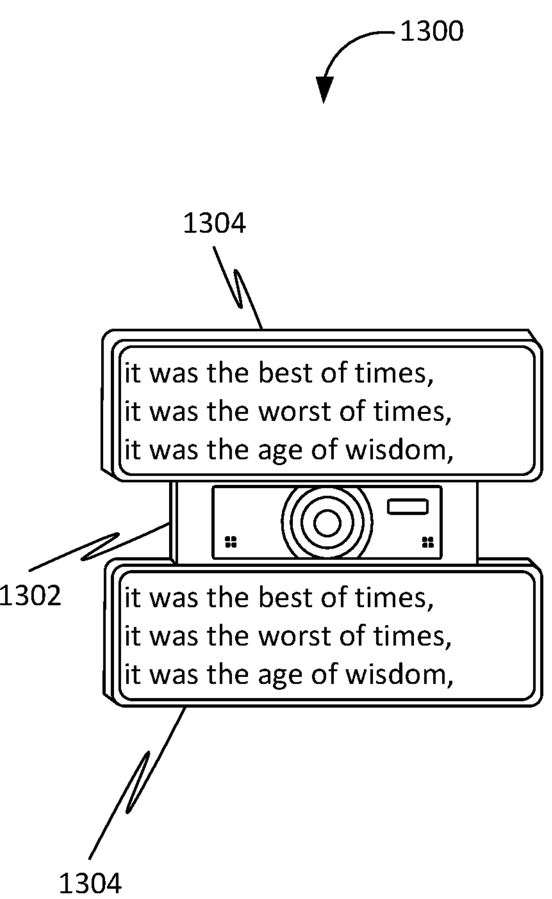
FIG. 14 is a front perspective view of the apparatus 1300 in a vertical arrangement, in accordance with some embodiments.

FIG. 14 is a front perspective view of the apparatus 1300 in a vertical arrangement, in accordance with some embodiments. Further, the plurality of display devices 1304-1306 may be linearly aligned along a vertical axis of the image capturing device 1302 in the vertical arrangement. Further, the vertical axis may be perpendicular to the horizontal axis.

Figure 15:
FIG. 15 is a front perspective view of an apparatus 1500 for facilitating managing a body language of a user during a video communication session with a computing device 1510 and at least one support 1508, in accordance with some embodiments.
Figure 15:
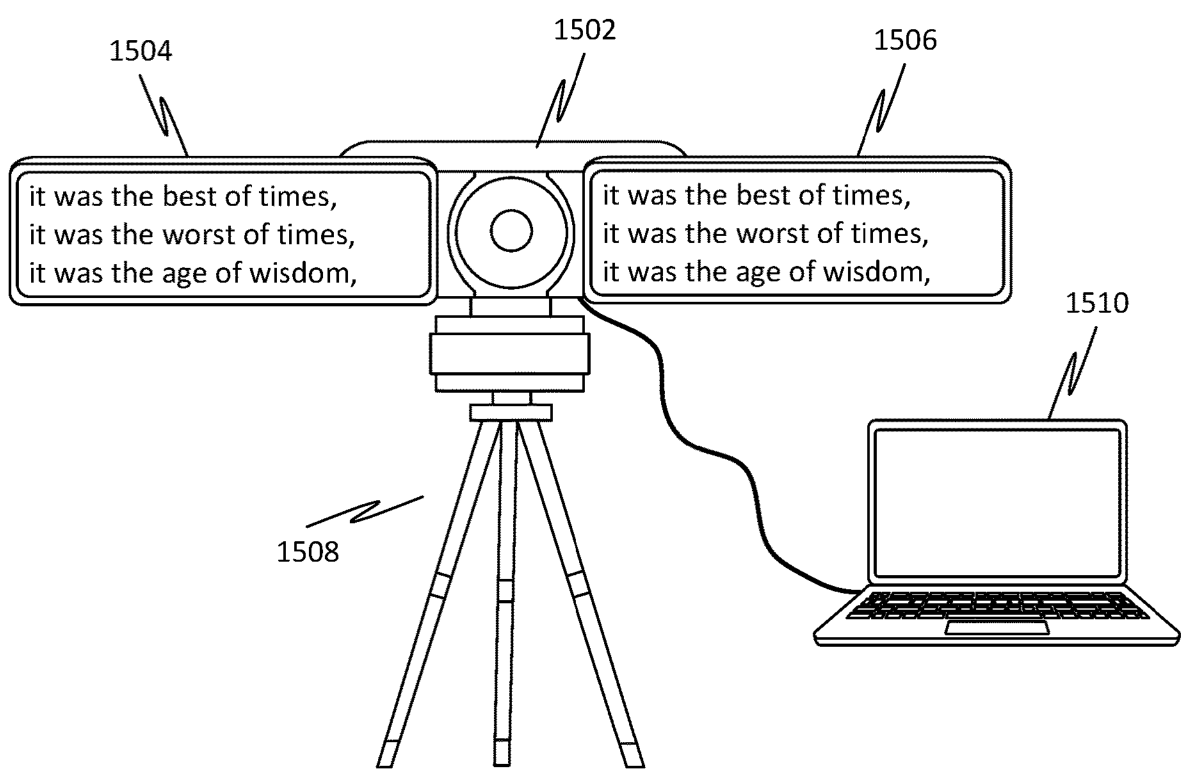

FIG. 15 is a front perspective view of an apparatus 1500 for facilitating managing a body language of a user during a video communication session with a computing device 1510 and at least one support 1508, in accordance with some embodiments. Further, the apparatus 1500 may be mounted on the at least one support 1508. Further, the apparatus 1500 may include an image capturing device 1502 and a plurality of display devices 1504-1506. Further, at least one of the image capturing device 1502 and the plurality of display devices 1504-1506 may be communicatively coupled with the computing device 1510.

FIG. 16 is a front view of an apparatus 1600 for facilitating managing a body language of a user during a video communication session, in accordance with some embodiments. Further, the apparatus 1600 may include an image capturing device 1602 and a plurality of display devices 1604-1606. Further, the image capturing device 1602 may include an image capturing device housing 1608. Further, each of the plurality of display devices 1604-1606 may include a display device housing (1610 and 1612), Further, the plurality of display devices 1604-1606 may be configured to be removably attached to the image capturing device 1602 using a plurality of attaching mechanisms 1614-1616. Further, each of the plurality of attaching mechanisms 1614-1616 extends between a first end (1618 and 1622) and a second end (1620 and 1624). Further, each of the plurality of attaching mechanisms 1614-1616 may include a first snap feature (1626, 1628, 1630, and 1632) comprised in at least one of the first end (1618 and 1622) and the second end (1620 and 1624). Further, at least one of the image capturing device housing 1608 and the display device housing (1610 and 1612) may include a second snap feature (1634, 1636, 1638, and 1640). Further, the first snap feature (1626, 1628, 1630, and 1632) disengageably engages with the second snap feature (1634, 1636, 1638, and 1640). Further, the first snap feature (1626, 1628, 1630, and 1632) and the second snap feature (1634, 1636, 1638, and 1640) may include at least one of a recess and a protrusion. Further, the first snap feature (1626, 1628, 1630, and 1632) and the second snap feature (1634, 1636, 1638, and 1640) may include at least one magnet. Further, an interior structure of the first snap feature (1626, 1628, 1630, and 1632) may be complementary to an external structure of the second snap feature (1634, 1636, 1638, and 1640). Further, the first snap feature (1626, 1628, 1630, and 1632) and the second snap feature (1634, 1636, 1638, and 1640) may be comprised of at least one flexible material allowing the first snap feature (1626, 1628, 1630, and 1632) and the second snap feature (1634, 1636, 1638, and 1640) to flex or compress during disengageably engaging.

Figure 17:
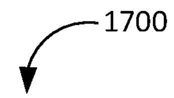
FIG. 17 is a top perspective view of an apparatus 1700 for facilitating managing a body language of a user during a video communication session, in accordance with some embodiments.
Figure 17:
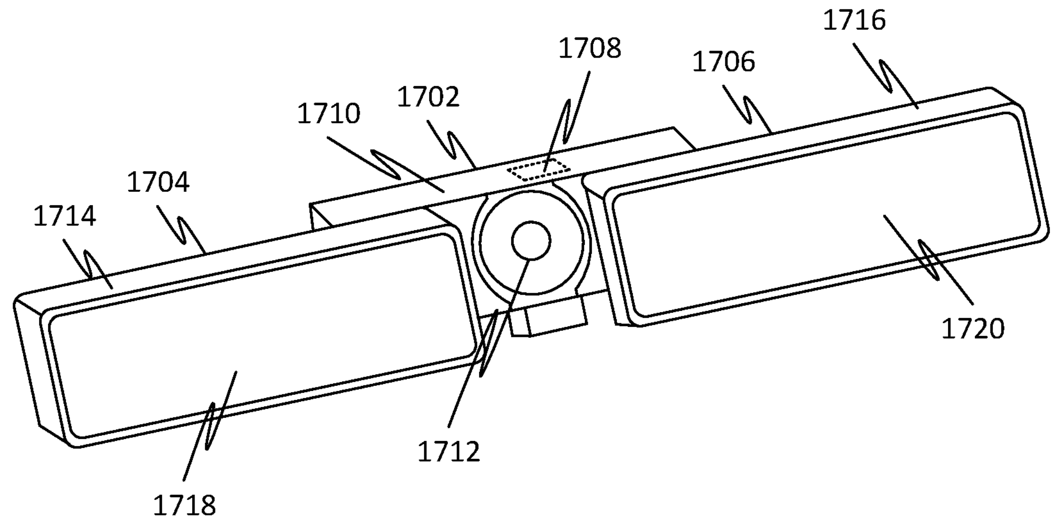

FIG. 17 is a top perspective view of an apparatus 1700 for facilitating managing a body language of a user during a video communication session, in accordance with some embodiments. Accordingly, the apparatus 1700 may include an image capturing device 1702, a plurality of display devices 1704-1706, and at least one communication interface 1708. Further, the video communication session may include a video meeting, a video conferencing, a video telecasting, a video podcasting, etc.

Further, the image capturing device 1702 may include an image capturing device housing 1710 and an image capturing unit 1712. Further, the image capturing unit 1712 may be housed in the mage capturing device housing 1710. Further, the image capturing unit 1712 may include a webcam sensor, a camera sensor, a video camera sensor, a DSLR camera sensor, etc. Further, the image capturing device housing 1710 may be a body of the image capturing device 1702. Further, the image capturing unit 1712 may be configured for generating a first content stream comprising the body language of the user by capturing a plurality of images of the user. Further, the first content stream may include a feed of a presenter (a video track). Further, the body language may include eye contact, posture, gesture, orientation, facial expression, lean, movement, etc., of the user. Further, the user may be an individual, a presenter, etc.

Further, the plurality of display devices 1704-1706 may be configured to be attached to the image capturing device 1702 in at least one arrangement using a plurality of attaching mechanisms. Further, the plurality of display devices 1704-1706 may include monitors, mini-monitors, etc. Further, the plurality of display devices 1704-1706 may be radially arranged around the image capturing device 1702. Further, the image capturing device 1702 may be in the middle of the plurality of display devices 1704-1706. Further, each of the plurality of display devices 1704-1706 may include a display device housing (1714 and 1716) and a display unit (1718 and 1720). Further, the display device housing (1714 and 1716) houses the display unit (1718 and 1720). Further, the display unit (1718 and 1720) may include a display screen. Further, the display device housing (1714 and 1716) forms a body of each of the plurality of display devices 1704-1706. Further, the plurality of attaching mechanisms attaches the display device housing (1714 and 1716) of the plurality of display devices 1704-1706 to a plurality of sides of the image capturing device housing 1710. Further, the display unit (1718 and 1720) of the plurality of display devices 1704-1706 may be configured for displaying a plurality of second content streams to the user. Further, the plurality of second content streams may include a set of talking points (text), a feed of an audience (a video track), a feed of a presenter (a video track), a presentation (slides, images, text, charts, graphs, multimedia elements, etc.), etc. Further, the user engages in the video communication session based on the displaying of the plurality of second content streams and the capturing of the first content stream. Further, the displaying of the plurality of second content streams allows the managing of the body language of the user during the capturing of the first content stream. Further, the plurality of display devices 1704-1706 may include at least one first display device 1704 and at least one second display device 1706. Further, the image capturing unit 1712 may be communicatively coupled with the display unit 1718 of the at least one first display device 1704. Further, the display unit 1718 of the at least one first display device 1704 may be configured for displaying the first content stream. Further, the display unit 1720 of the at least one second display device 1706 may be configured for displaying at least one of the plurality of second content streams.

Further, the at least one communication interface 1708 may be communicatively coupled with the image capturing unit 1712. Further, the at least one communication interface 1708 may be configured for transmitting the first content stream to at least one device over at least one of a wired communication channel and a wireless communication channel. Further, the wireless communication channel may include Bluetooth, Wi-Fi, Infrared, etc. Further, the at least one device may include a computing device, a client device, a user device, a server, etc. Further, the at least one communication interface 1708 may be housed in the image capturing device housing 1710. Further, the at least one communication interface 1708 may be wireless communication interfaces (such as Wi-Fi, Bluetooth, Zigbee, etc.), communication ports, Ethernet interface, USB (Universal Serial Bus) Interfaces, etc. comprised in a microcomputer. Further, the microcomputer may include communication controllers for specific communication protocols. Further, the microcomputer may be a Wi-Fi enabled microcomputer. Further, the WiFi enabled microcomputer may include the at least one communication interface 1708.

Figure 18:
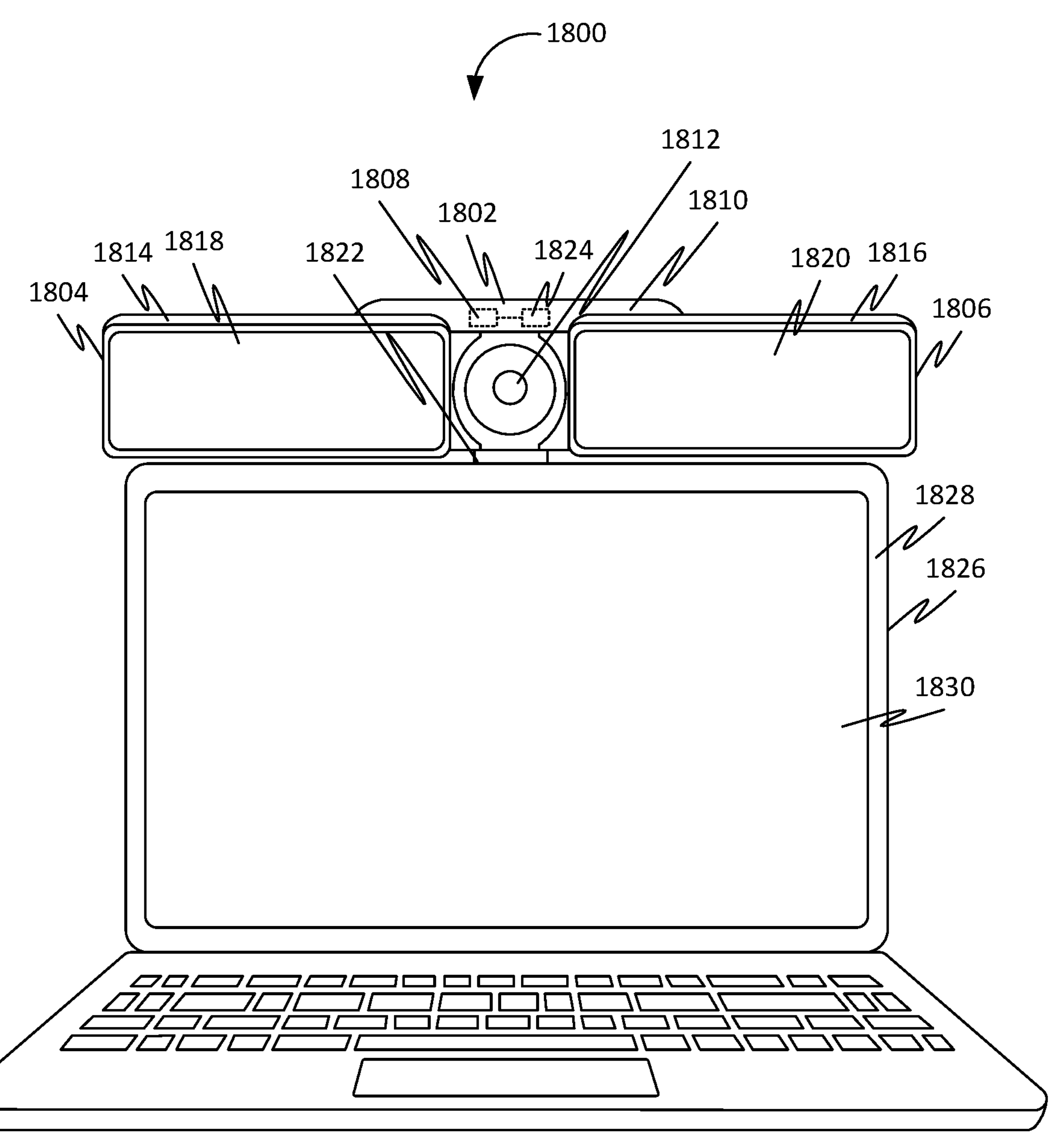
FIG. 18 is a top perspective view of an apparatus 1800 for facilitating managing a body language of a user during a video communication session, in accordance with some embodiments.

FIG. 18 is a top perspective view of an apparatus 1800 for facilitating managing a body language of a user during a video communication session, in accordance with some embodiments. Accordingly, the apparatus 1800 may include an image capturing device 1802, a plurality of display devices 1804-1806, at least one communication interface 1808, at least one mounting element 1822, and a processing device 1824. Further, the video communication session may include a video meeting, a video conferencing, a video telecasting, a video podcasting, etc.

Further, the image capturing device 1802 may include an image capturing device housing 1810 and an image capturing unit 1812. Further, the image capturing unit 1812 may be housed in the mage capturing device housing 1810. Further, the image capturing unit 1812 may include a webcam sensor, a camera sensor, a video camera sensor, a DSLR camera sensor, etc. Further, the image capturing device housing 1810 may be a body of the image capturing device 1802. Further, the image capturing unit 1812 may be configured for generating a first content stream comprising the body language of the user by capturing a plurality of images of the user. Further, the first content stream may include a feed of a presenter (a video track). Further, the body language may include eye contact, posture, gesture, orientation, facial expression, lean, movement, etc., of the user. Further, the user may be an individual, a presenter, etc.

Further, the plurality of display devices 1804-1806 may be configured to be attached to the image capturing device 1802 in at least one arrangement using a plurality of attaching mechanisms. Further, the plurality of display devices 1804-1806 may include monitors, mini-monitors, etc. Further, the plurality of display devices 1804-1806 may be radially arranged around the image capturing device 1802. Further, the image capturing device 1802 may be in the middle of the plurality of display devices 1804-1806. Further, each of the plurality of display devices 1804-1806 may include a display device housing (1814 and 1816) and a display unit (1818 and 1820). Further, the display device housing (1814 and 1816) houses the display unit (1818 and 1820). Further, the display unit (1818 and 1820) may include a display screen. Further, the display device housing (1814 and 1816) forms a body of each of the plurality of display devices 1804-1806. Further, the plurality of attaching mechanisms attaches the display device housing (1814 and 1816) of the plurality of display devices 1804-1806 to a plurality of sides of the image capturing device housing 1810. Further, the display unit (1818 and 1820) of the plurality of display devices 1804-1806 may be configured for displaying a plurality of second content streams to the user. Further, the plurality of second content streams may include a set of talking points (text), a feed of an audience (a video track), a feed of a presenter (a video track), a presentation (slides, images, text, charts, graphs, multimedia elements, etc.), etc. Further, the user engages in the video communication session based on the displaying of the plurality of second content streams and the capturing of the first content stream. Further, the displaying of the plurality of second content streams allows the managing of the body language of the user during the capturing of the first content stream.

Further, the at least one communication interface 1808 may be communicatively coupled with the image capturing unit 1812. Further, the at least one communication interface 1808 may be configured for transmitting the first content stream to at least one device over at least one of a wired communication channel and a wireless communication channel. Further, the wireless communication channel may include Bluetooth, Wi-Fi, Infrared, etc. Further, the at least one device may include a computing device, a client device, a user device, a server, etc. Further, the at least one communication interface 1808 may be housed in the image capturing device housing 1810. Further, the at least one communication interface 1808 may be wireless communication interfaces (such as Wi-Fi, Bluetooth, Zigbee, etc.), communication ports, Ethernet interface, USB (Universal Serial Bus) Interfaces, etc. comprised in a microcomputer.

Further, the microcomputer may include communication controllers for specific communication protocols.

Further, the at least one mounting element 1822 attached to at least one of the image capturing device housing 1810 and the display device housing (1814 and 1816) of at least one of the plurality of display devices 1804-1806. Further, the at least one mounting element 1822 may include a clamp, a holder, a clip-on mechanism, a permanent magnet, etc. Further, the at least one mounting element 1822 may be configured for attaching the apparatus 1800 to a body 1828 of a computing device 1826. Further, the computing device 1826 may include a laptop, a desktop, a tablet, a smartphone, etc. Further, the computing device 1826 may include a display unit 1830. Further, the display unit 1830 of the computing device 1826 may include a display screen.

Further, the processing device 1824 may be configured to be communicatively coupled with the computing device 1826. Further, the processing device 1824 may be housed in the image capturing device housing 1810. Further, the processing device 1824 may be configured for obtaining at least one data from the computing device 1826. Further, the processing device 1824 may be configured for determining a performance of at least one operation by the computing device 1826 based on the at least one data. Further, the at least one operation may correspond to the video communication session initiated via the computing device 1826. Further, the performance may include a positive performance and a negative performance. Further, the positive performance may be determined when the video communication session is ongoing and the negative performance may be determined when the video communication session is not ongoing. Further, the processing device 1824 may be configured for determining the plurality of second content streams based on the performance and the at least one data. Further, the display unit (1818 and 1820) of each of the plurality of display devices 1804-1806 may be communicatively coupled with the processing device 1824. Further, the displaying of the plurality of second content streams may be based on the determining of the plurality of second content streams. Further, the processing device 1824 may be a central processing unit (CPU) of the microcomputer. Further, the micro-computer may be a WiFi enabled microcomputer. Further, the WiFi enabled microcomputer may include the at least one communication interface 1808 and the processing device 1824.

Figure 19:
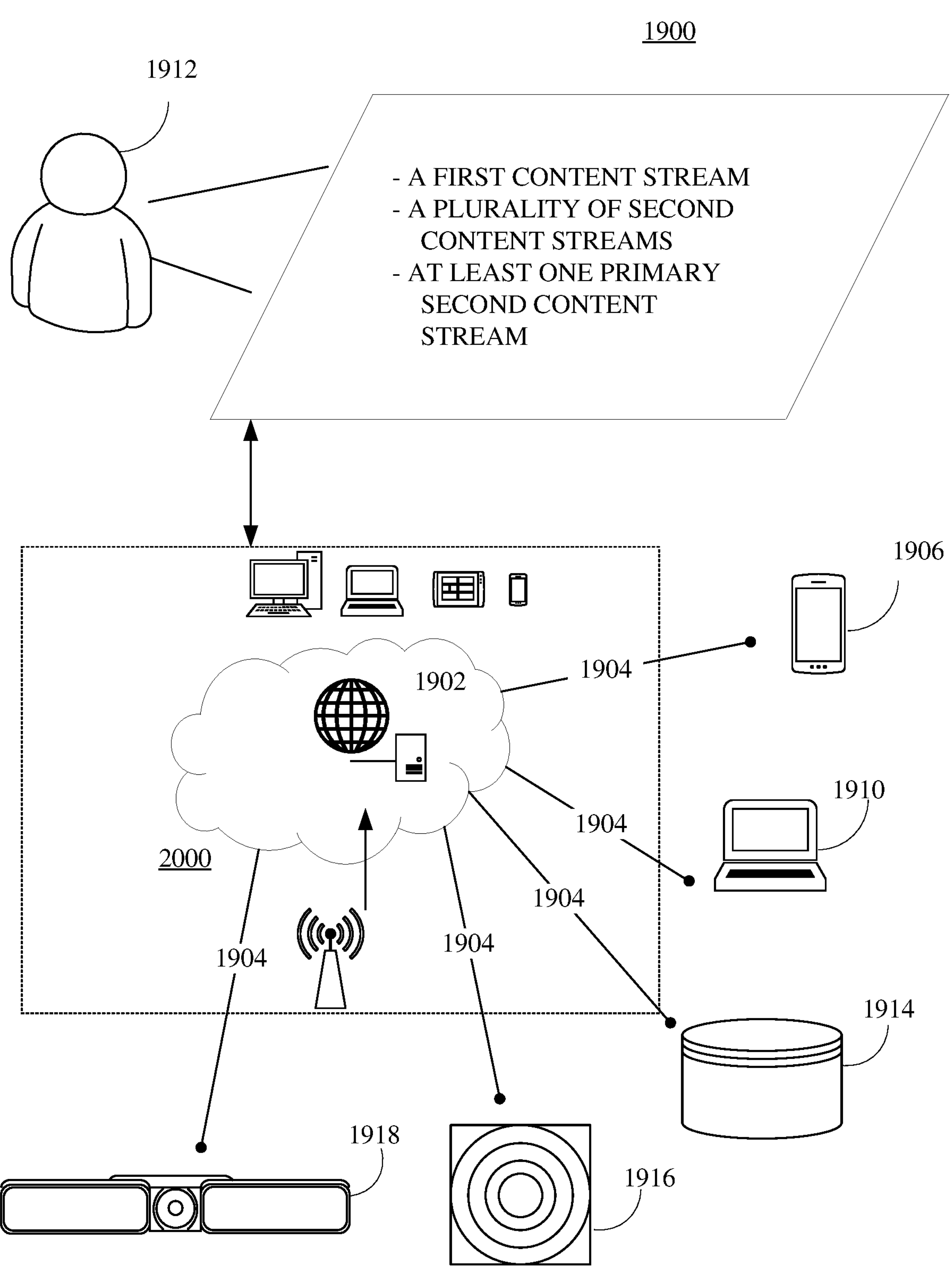
FIG. 19 is an illustration of an online platform consistent with various embodiments of the present disclosure.

FIG. 19 is an illustration of an online platform 1900 consistent with various embodiments of the present disclosure. By way of non-limiting example, the online platform 1900 to facilitate managing a body language of a user during a video communication session may be hosted on a centralized server 1902, such as, for example, a cloud computing service. The centralized server 1902 may communicate with other network entities, such as, for example, a mobile device 1906 (such as a smartphone, a laptop, a tablet computer, etc.), other electronic devices 1910 (such as desktop computers, server computers, etc.), databases 1914, sensors 1916, and an apparatus 1918 (such as the apparatus 100, the apparatus 1200, the apparatus 1300, the apparatus 1500, the apparatus 1600, the apparatus 1700, and the apparatus 1800) over a communication network 1904, such as, but not limited to, the Internet. Further, users of the online platform 1900 may include relevant parties such as, but not limited to, end-users, administrators, service providers, service consumers, and so on. Accordingly, in some instances, electronic devices operated by the one or more relevant parties may be in communication with the platform.

A user 1912, such as the one or more relevant parties, may access online platform 1900 through a web based software application or browser. The web based software application may be embodied as, for example, but not be limited to, a website, a web application, a desktop application, and a mobile application compatible with a computing device 2000.

Figure 20:
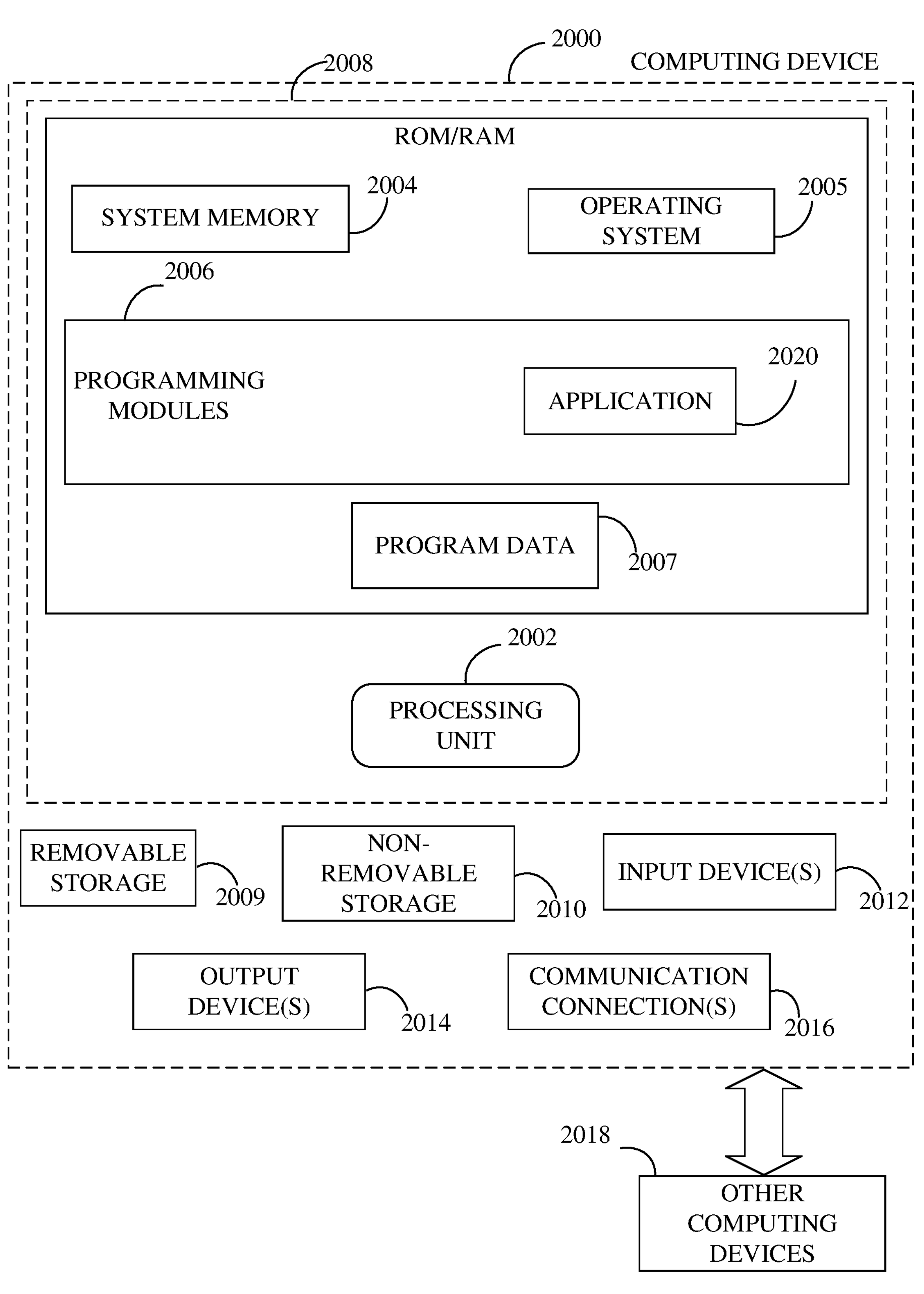
FIG. 20 is a block diagram of a computing device for implementing the methods disclosed herein, in accordance with some embodiments.

With reference to FIG. 20, a system consistent with an embodiment of the disclosure may include a computing device or cloud service, such as computing device 2000. In a basic configuration, computing device 2000 may include at least one processing unit 2002 and a system memory 2004. Depending on the configuration and type of computing device, system memory 2004 may comprise, but is not limited to, volatile (e.g. random-access memory (RAM)), non-volatile (e.g. read-only memory (ROM)), flash memory, or any combination. System memory 2004 may include operating system 2005, one or more programming modules 2006, and may include a program data 2007. Operating system 2005, for example, may be suitable for controlling computing device 2000's operation. In one embodiment, programming modules 2006 may include image-processing modules. Furthermore, embodiments of the disclosure may be practiced in conjunction with a graphics library, other operating systems, or any other application program and is not limited to any particular application or system. This basic configuration is illustrated in FIG. 20 by those components within a dashed line 2008.

Computing device 2000 may have additional features or functionality. For example, computing device 2000 may also include additional data storage devices (removable and/or non-removable) such as, for example, magnetic disks, optical disks, or tape. Such additional storage is illustrated in FIG. 20 by a removable storage 2009 and a non-removable storage 2010. Computer storage media may include volatile and non-volatile, removable and non-removable media implemented in any method or technology for storage of information, such as computer-readable instructions, data structures, program modules, or other data. System memory 2004, removable storage 2009, and non-removable storage 2010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2000. Any such computer storage media may be part of device 2000. Computing device 2000 may also have input device(s) 2012 such as a keyboard, a mouse, a pen, a sound input device, a touch input device, a location sensor, a camera, a biometric sensor, etc. Output device(s) 2014 such as a display, speakers, a printer, etc. may also be included. The aforementioned devices are examples and others may be used.

Computing device 2000 may also contain a communication connection 2016 that may allow device 2000 to communicate with other computing devices 2018, such as over a network in a distributed computing environment, for example, an intranet or the Internet. Communication connection 2016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2004, including operating system 2005. While executing on processing unit 2002, programming modules 2006 (e.g., application 2020 such as a media player) may perform processes including, for example, one or more stages of methods, algorithms, systems, applications, servers, databases as described above. The aforementioned process is an example, and processing unit 2002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for facilitating managing a body language of a user during a video communication session, the apparatus comprising:

an image capturing device comprising an image capturing device housing and an image capturing unit, wherein the image capturing unit is configured for generating a first content stream comprising the body language of the user by capturing a plurality of images of the user;

a plurality of display devices configured to be attached to the image capturing device in at least one arrangement using a plurality of attaching mechanisms, wherein the plurality of display devices are radially arranged around the image capturing device, wherein each of the plurality of display devices comprises a display device housing and a display unit, wherein the plurality of attaching mechanisms attaches the display device housing of the plurality of display devices to a plurality of sides of the image capturing device housing, wherein the display unit of the plurality of display devices is configured for displaying a plurality of second content streams to the user, wherein the user engages in the video communication session based on the displaying of the plurality of second content streams and the capturing of the first content stream, wherein the displaying of the plurality of second content streams allows the managing of the body language of the user during the capturing of the first content stream, wherein the plurality of display devices is further configured to be hingedly attached to the image capturing device using the plurality of attaching mechanisms, wherein the plurality of attaching mechanisms allows transitioning of the plurality of display devices between at least one folded configuration and an unfolded configuration in relation to the image capturing device, wherein the plurality of display devices are aligned in a flat plane with the image capturing device in the unfolded configuration, wherein the plurality of display devices are folded over at least one of the image capturing device and at least one of the plurality of display devices in the at least one folded configuration; and at least one communication interface communicatively coupled with the image capturing unit, wherein the at least one communication interface is configured for transmitting the first content stream to at least one device over at least one of a wired communication channel and a wireless communication channel.

2. The apparatus of claim 1, wherein the at least one arrangement further comprises at least one of a vertical arrangement and a horizontal arrangement, wherein the plurality of display devices are linearly aligned along a horizontal axis of the image capturing device in the horizontal arrangement, wherein the plurality of display devices are linearly aligned along a vertical axis of the image capturing device in the vertical arrangement, wherein the vertical axis is perpendicular to the horizontal axis.

3. The apparatus of claim 2, wherein the plurality of display devices is further configured to be movably attached to the image capturing device using the plurality of attaching mechanisms, wherein the plurality of attaching mechanisms allows transitioning of the plurality of display devices between a plurality of positions in relation to the image capturing device, wherein the transitioning of the plurality of display devices transitions the plurality of display devices between the horizontal arrangement and the vertical arrangement.

4. The apparatus of claim 3, wherein each of the plurality of attaching mechanisms extends between a first end and a second end, wherein each of the plurality of attaching mechanisms comprises a first articulating element comprised in the first end and a second articulating element comprised in the second end, wherein the first articulating element of each of the plurality of attaching mechanisms is coupled to the image capturing device housing and the second articulating element of each of the plurality of attaching mechanisms is coupled to the display device housing of each of the plurality of display devices, wherein the first articulating element allows a rotational movement for the image capturing device housing around a plurality of first axes of the first articulating element, wherein the second articulating element allows the rotational movement for the display device housing around a plurality of second axes of the second articulating element, wherein the rotational movement of the image capturing device housing allows the transitioning of the plurality of display devices between the plurality of positions.

5. The apparatus of claim 1, wherein the plurality of display devices comprises a pair of horizontal display devices and a pair of vertical display devices, wherein the at least one arrangement further comprises a vertical arrangement for the pair of vertical display devices and a horizontal arrangement for the pair of horizontal display devices, wherein the pair of horizontal display devices are linearly aligned along a horizontal axis of the image capturing device in the horizontal arrangement, wherein the pair of vertical display devices are linearly aligned along a vertical axis of the image capturing device in the vertical arrangement, wherein the vertical axis is perpendicular to the horizontal axis.

6. The apparatus of claim 1, wherein each of the plurality of attaching mechanisms extends between a first end and a second end, wherein each of the plurality of attaching mechanisms comprises a hinge element between the first end and the second end, wherein the first end of each of the plurality of attaching mechanisms is attached to the image capturing device housing and the second end of each of the plurality of attaching mechanisms is coupled to the display device housing of each of the plurality of display devices, wherein the hinge element allows a rotational movement for the image capturing device housing around a central axis of the hinge element, wherein the rotational movement of the image capturing device housing allows the transitioning of the plurality of display devices between the at least one folded configuration and the unfolded configuration.

7. The apparatus of claim 1 further comprising at least one mounting element attached to at least one of the image capturing device housing and the display device housing of at least one of the plurality of display devices.

8. The apparatus of claim 7, wherein the at least one mounting element is configured for attaching the apparatus to a body of a computing device, wherein the computing device comprises a display unit, wherein the apparatus further comprises a processing device, wherein the processing device is configured to be communicatively coupled with the computing device, wherein the processing device is configured for:

obtaining at least one data from the computing device;

determining a performance of at least one operation by the computing device based on the at least one data, wherein the performance comprises a positive performance and a negative performance; and determining the plurality of second content streams based on the performance and the at least one data, wherein the display unit of each of the plurality of display devices is communicatively coupled with the processing device, wherein the displaying of the plurality of second content streams is based on the determining of the plurality of second content streams.

9. The apparatus of claim 8, wherein the determining of the plurality of second content streams comprises:

obtaining at least one third content stream associated with the video communication session from the computing device based on the positive performance, wherein the display unit of the computing device displays the at least one third content stream;

processing the at least one third content stream; and generating the plurality of second content streams based on the processing, wherein the display unit of the computing device ceases to display the at least one third content stream based on the generating of the plurality of second content streams.

10. The apparatus of claim 8, wherein the determining of the plurality of second content streams comprises identifying the plurality of second content streams based on the negative performance.

11. The apparatus of claim 7, wherein the at least one mounting element is configured for mounting the apparatus to at least one support.

12. The apparatus of claim 1, wherein the display unit of each of the plurality of display devices is further configured for collectively displaying the plurality of second content streams.

13. The apparatus of claim 1, wherein the display unit of each of the plurality of display devices is further configured for individually displaying each of the plurality of second content streams.

14. The apparatus of claim 1, wherein the plurality of display devices comprises at least one first display device and at least one second display device, wherein the image capturing unit is communicatively coupled with the display unit of the at least one first display device, wherein the display unit of the at least one first display device is configured for displaying the first content stream, wherein the display unit of the at least one second display device is configured for displaying at least one of the plurality of second content streams.

15. The apparatus of claim 1, wherein the plurality of second content streams comprises at least one primary second content stream and at least one secondary second content stream, wherein the plurality of display devices comprises at least one first display device and at least one second display device, wherein the display unit of each of the at least one first display device is configured for displaying the at least one primary second content stream, wherein the display unit of the at least one second display device is configured for displaying the at least one secondary second content stream.

16. The apparatus of claim 1, wherein the apparatus is associated with a unique identifier, wherein the at least one communication interface is configured for receiving the plurality of second content streams from the at least one device through at least one network over at least one of the wired communication channel and the wireless communication channel using the unique identifier, wherein the transmitting of the first content stream comprises transmitting the first content stream to the at least one device through the at least one network over at least one of the wired communication channel and the wireless communication channel using the unique identifier.

17. The apparatus of claim 1, wherein the plurality of display devices is further configured to be removably attached to the image capturing device using the plurality of attaching mechanisms, wherein each of the plurality of attaching mechanisms extends between a first end and a second end, wherein each of the plurality of attaching mechanisms comprises a first snap feature comprised in at least one of the first end and the second end, wherein at least one of the image capturing device housing and the display device housing comprises a second snap feature, wherein the first snap feature disengageably engages with the second snap feature.

18. An apparatus for facilitating managing a body language of a user during a video communication session, the apparatus comprising:

an image capturing device comprising an image capturing device housing and an image capturing unit, wherein the image capturing unit is configured for generating a first content stream comprising the body language of the user by capturing a plurality of images of the user;

a plurality of display devices configured to be attached to the image capturing device in at least one arrangement using a plurality of attaching mechanisms, wherein the plurality of display devices are radially arranged around the image capturing device, wherein each of the plurality of display devices comprises a display device housing and a display unit, wherein the plurality of attaching mechanisms attaches the display device housing of the plurality of display devices to a plurality of sides of the image capturing device housing, wherein the display unit of the plurality of display devices is configured for displaying a plurality of second content streams to the user, wherein the user engages in the video communication session based on the displaying of the plurality of second content streams and the capturing of the first content stream, wherein the displaying of the plurality of second content streams allows the managing of the body language of the user during the capturing of the first content stream, wherein the plurality of display devices further comprises at least one first display device and at least one second display device, wherein the image capturing unit is communicatively coupled with the display unit of the at least one first display device, wherein the display unit of the at least one first display device is configured for displaying the first content stream, wherein the display unit of the at least one second display device is configured for displaying at least one of the plurality of second content streams, wherein the plurality of display devices is further configured to be hingedly attached to the image capturing device using the plurality of attaching mechanisms, wherein the plurality of attaching mechanisms allows transitioning of the plurality of display devices between at least one folded configuration and an unfolded configuration in relation to the image capturing device, wherein the plurality of display devices are aligned in a flat plane with the image capturing device in the unfolded configuration, wherein the plurality of display devices are folded over at least one of the image capturing device and at least one of the plurality of display devices in the at least one folded configuration; and at least one communication interface communicatively coupled with the image capturing unit, wherein the at least one communication interface is configured for transmitting the first content stream to at least one device over at least one of a wired communication channel and a wireless communication channel.

19. An apparatus for facilitating managing a body language of a user during a video communication session, the apparatus comprising:

an image capturing device comprising an image capturing device housing and an image capturing unit, wherein the image capturing unit is configured for generating a first content stream comprising the body language of the user by capturing a plurality of images of the user;

a plurality of display devices configured to be attached to the image capturing device in at least one arrangement using a plurality of attaching mechanisms, wherein the plurality of display devices are radially arranged around the image capturing device, wherein each of the plurality of display devices comprises a display device housing and a display unit, wherein the plurality of attaching mechanisms attaches the display device housing of the plurality of display devices to a plurality of sides of the image capturing device housing, wherein the display unit of the plurality of display devices is configured for displaying a plurality of second content streams to the user, wherein the user engages in the video communication session based on the displaying of the plurality of second content streams and the capturing of the first content stream, wherein the displaying of the plurality of second content streams allows the managing of the body language of the user during the capturing of the first content stream, wherein the plurality of display devices is further configured to be hingedly attached to the image capturing device using the plurality of attaching mechanisms, wherein the plurality of attaching mechanisms allows transitioning of the plurality of display devices between at least one folded configuration and an unfolded configuration in relation to the image capturing device, wherein the plurality of display devices are aligned in a flat plane with the image capturing device in the unfolded configuration, wherein the plurality of display devices are folded over at least one of the image capturing device and at least one of the plurality of display devices in the at least one folded configuration;

at least one communication interface communicatively coupled with the image capturing unit, wherein the at least one communication interface is configured for transmitting the first content stream to at least one device over at least one of a wired communication channel and a wireless communication channel;

at least one mounting element attached to at least one of the image capturing device housing and the display device housing of at least one of the plurality of display devices, wherein the at least one mounting element is configured for attaching the apparatus to a body of a computing device, wherein the computing device comprises a display unit; and a processing device configured to be communicatively coupled with the computing device, wherein the processing device is configured for:

obtaining at least one data from the computing device;

determining a performance of at least one operation by the computing device based on the at least one data, wherein the performance comprises a positive performance and a negative performance; and determining the plurality of second content streams based on the performance and the at least one data, wherein the display unit of each of the plurality of display devices is communicatively coupled with the processing device, wherein the displaying of the plurality of second content streams is based on the determining of the plurality of second content streams.

* * * * *